(12) United States Patent
Choi et al.

(10) Patent No.: US 12,188,162 B2
(45) Date of Patent: Jan. 7, 2025

(54) SPUNBONDED NONWOVEN AND TILE CARPET USING THE SAME

(71) Applicant: KOLON INDUSTRIES, INC., Seoul (KR)

(72) Inventors: Woo-seok Choi, Seoul (KR); Min Ho Lee, Seoul (KR); Hee-jung Cho, Seoul (KR); Young-shin Park, Seoul (KR); Jung-soon Jang, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 349 days.

(21) Appl. No.: 17/715,985

(22) Filed: Apr. 8, 2022

(65) Prior Publication Data

US 2022/0228307 A1 Jul. 21, 2022

Related U.S. Application Data

(63) Continuation of application No. PCT/KR2020/015043, filed on Oct. 30, 2020.

(30) Foreign Application Priority Data

Nov. 8, 2019 (KR) .......................... 10-2019-0142206

(51) Int. Cl.
*D04H 3/011* (2012.01)
*A47G 27/02* (2006.01)
*D04H 3/073* (2012.01)

(52) U.S. Cl.
CPC ............ *D04H 3/011* (2013.01); *D04H 3/073* (2013.01); *A47G 27/02* (2013.01); *D10B 2331/04* (2013.01); *D10B 2503/041* (2013.01)

(58) Field of Classification Search
None
See application file for complete search history.

(56) References Cited

U.S. PATENT DOCUMENTS

| | | | |
|---|---|---|---|
| 6,169,121 | B1 | 1/2001 | Noguchi |
| 2003/0032357 | A1 | 2/2003 | Gillespie |
| 2015/0176201 | A1 | 6/2015 | Flendrig |

FOREIGN PATENT DOCUMENTS

| | | |
|---|---|---|
| CN | 1511823 A | 7/2004 |
| CN | 101490335 A | 7/2009 |
| CN | 102605454 A | 7/2012 |
| JP | H1072725 A | 3/1998 |
| JP | H10273863 A | 10/1998 |
| JP | 2000160429 A | 6/2000 |
| JP | 2000-355066 A | 12/2000 |
| JP | 2002167469 A | 6/2002 |
| JP | 2002345624 A | 12/2002 |
| JP | 2004-330534 A | 11/2004 |
| JP | 2005-008997 A | 1/2005 |
| JP | 2005179877 A | 7/2005 |

(Continued)

OTHER PUBLICATIONS

International Search Report dated Feb. 24, 2021.

*Primary Examiner* — Shawn Mckinnon
(74) *Attorney, Agent, or Firm* — Harvest IP Law, LLP

(57) ABSTRACT

The present disclosure relates to a spunbond nonwoven fabric for a tile carpet base fabric which can manufacture tile carpets with excellent sound absorption performance and tuft withdraw force, including high-thickness nonwoven fabrics made of hollow fibers to which recycled polyester raw materials are applied, and a tile carpet using the same.

8 Claims, 1 Drawing Sheet

(a)

(b)

(56) References Cited

FOREIGN PATENT DOCUMENTS

| | | | |
|---|---|---|---|
| JP | 2005-240218 | A | 9/2005 |
| JP | 2005-325507 | A | 11/2005 |
| JP | 2007-303012 | A | 11/2007 |
| JP | 2009-074212 | A | 4/2009 |
| JP | 2011-208346 | A | 10/2011 |
| JP | 2013-076187 | A | 4/2013 |
| JP | 2014-167185 | A | 9/2014 |
| JP | 2016-193121 | A | 11/2016 |
| JP | 2018-162527 | A | 10/2018 |
| JP | 2019-154596 | A | 9/2019 |
| KR | 20000018763 | A | 4/2000 |
| KR | 1020000018763 | A | 4/2000 |
| KR | 1020110080271 | A | 9/2002 |
| KR | 100544992 | B1 | 1/2006 |
| KR | 20110080271 | A | 7/2011 |
| KR | 1020120033767 | A | 4/2012 |
| KR | 2014-0119351 | A | 10/2014 |
| KR | 2015-0034737 | A | 4/2015 |
| KR | 20150035138 | A | 4/2015 |
| KR | 2015-0113327 | A | 10/2015 |
| KR | 2017-0001319 | A | 1/2017 |
| KR | 101976119 | B1 | 5/2019 |
| WO | 2019-059573 | A2 | 3/2019 |
| WO | 2019-009539 | A1 | 4/2019 |

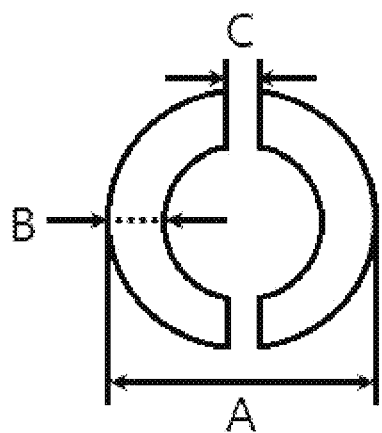
(a)
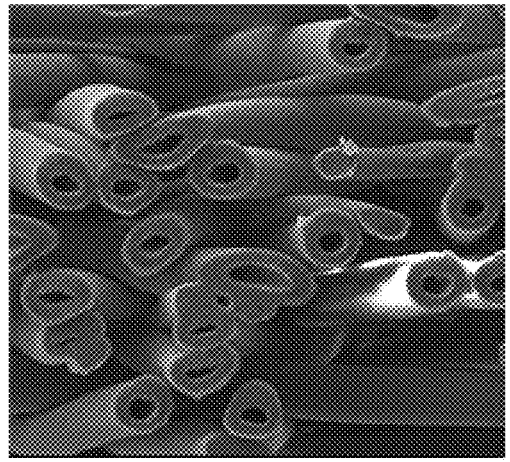
(b)

SPUNBONDED NONWOVEN AND TILE CARPET USING THE SAME

CROSS-REFERENCE TO RELATED APPLICATION(S)

This application is a National Stage of International Application No. PCT/KR2020/015043 filed on Oct. 30, 2020, claiming the benefit of Korean Patent Application No. 10-2019-0142206 filed on Nov. 8, 2019 in the Korean Intellectual Property Office, the disclosure of which is incorporated herein by reference in its entirety.

TECHNICAL FIELD

The present disclosure relates to a spunbond nonwoven fabric that can be applied as a tile carpet base fabric exhibiting high functionality.

BACKGROUND ART

Nonwoven fabric is a product made by arranging filaments in a planar form, and is largely divided into a staple fiber nonwoven fabric and a long fiber nonwoven fabric according to the length of the filament. The staple fiber nonwoven fabric is a product made by arranging staple fibers of 5 mm or less in a planar form, and subjecting it to entanglement between fibers or resin adhesion, and has a feature of high elongation. The long fiber nonwoven fabric is a product made by arranging unbroken fibers in a planar shape and subjecting it to entanglement between fibers or resin adhesion, and has a feature of high strength.

Long-fiber nonwoven fabric, which has advantages such as excellent strength, is mainly used for construction and civil engineering purposes. In recent years, nonwoven fabrics have been expanded to be applied as interior/exterior materials for automobiles in accordance with the trend toward weight reduction in automobile materials. Further, a long fiber nonwoven fabric having a low weight while having the same strength as the interior material in the form of a conventionally used woven fabric or short-fiber nonwoven fabric is applied. The product groups that are mainly applied include tile carpets, automobile flooring carpets, under covers, head linear products, and the like.

Double tile carpets are used as flooring materials for homes or offices, and their main purpose is heat insulation and decoration. Further, since the carpet has better sound absorption than other flooring materials and has relatively little sound resonance, it plays a role in creating a quiet living environment. Such a tile carpet is subjected to a tufting process (a process of planting threads in a nonwoven fabric) and a back-coating process (a process of immersing a PVC solution into a back surface of the tufted nonwoven fabric, and then heat-curing it through a chamber) for the nonwoven fabric, and then finally to a cutting process (standard: 50 cm×50 cm) to manufacture a tile carpet.

For tile carpet products that are currently being used, waste such as renewable polyester plastics is recycled, and thus tile carpet products containing recycled polyester raw materials, which have excellent basic physical properties of nonwoven fabrics such as tensile strength while contributing to resource recycling and prevention of environmental pollution, are being developed. Further, in such a case, the use is expanding to nonwoven fabrics for landscaping, filters, etc. in addition to carpet products.

However, the use of recycled polyester raw materials may cause deterioration of product characteristics (e.g., chip agglomeration, poor spinnability, and poor nonwoven fabric physical properties) due to the differences in the chemical composition of additives and adhesives contained in nonwoven waste, and the inclusion of a large amount of foreign matter.

DETAILED DESCRIPTION OF THE INVENTION

Technical Problem

It is one object of the present disclosure to provide a spunbond nonwoven fabric that can be used as a tile carpet base fabric having excellent sound absorption performance and tuft withdraw force while having excellent basic physical properties of nonwoven fabric by applying recycled polyester raw materials with low foreign matter content and improved physical properties, and a method for manufacturing the same.

It is another object of the present disclosure to provide a tile carpet base fabric having excellent physical properties such as sound absorption and tuft withdraw force using the above-mentioned spunbond nonwoven fabric.

Technical Solution

According to one embodiment of the present disclosure, there can be provided a spunbonded nonwoven fabric including: a fiber web of mixed filament yarns of a first filament prepared from a polyester and a recycled polyester each having a melting point of 255° C. or more and a second filament prepared from a copolyester having a lower melting point than that of the first filament by 30° C. or more, wherein the first filament is a filament having a hollow fiber cross-section having a hollow ratio of 10 to 20%, wherein the raw material of the recycled polyester has an average number of foreign matters with a size of 1.0 to 10.0 μm, of 10 or less, and wherein the spunbonded nonwoven fabric has a tensile strength of 20 kgf/5 cm or more and a tensile elongation of 20% or more as measured according to the KS K 0521 test method, and is used as a base fabric for tile carpets.

According to another embodiment of the present disclosure, there can be provided a tile carpet including the spunbonded nonwoven fabric as a base fabric, and having a sound absorption coefficient (at 500 Hz) of 0.2 or more, and a tuft withdraw force of carpets of 2.0 kgf or more.

Hereinafter, a spunbond nonwoven fabric that can be used as a highly functional tile carpet base fabric having excellent sound absorption and tuft withdraw force according to embodiments of the present disclosure, and a manufacturing method thereof, will be described in detail.

Prior to the description, unless otherwise specified throughout this specification, the technical terms used herein are only for reference to specific embodiments and are not intended to limit the present disclosure.

The singular forms "a", "an", and "the" used herein include plural references unless the context clearly dictates otherwise.

The term "including" or "comprising" as used herein specifies a specific feature, region, integer, step, action, element, and/or component, but does not exclude the presence or addition of a different specific feature, region, integer, step, action, element, component, and/or group.

Further, the terms including ordinal numbers such as "a first", "a second", etc. are used only for the purpose of distinguishing one component from another component, and are not limited by the ordinal numbers. For instance, a first component may be referred to as a second component, or similarly, the second component may be referred to as the first component, without departing from the scope of the present disclosure.

The present inventors conducted continuous research to improve physical properties such as sound absorption performance and tuft withdraw force of tile carpets, and as a result, found that when providing long fiber spunbond nonwoven fabrics applicable to tile carpets, recycled polyester raw materials having a low foreign matter content and improved physical properties of the raw materials are applied, and at the same time, hollow fibers and high-thickness nonwoven fabrics are applied to enhance the functionality of the finished product tile carpet, thereby maximizing the sound absorption performance and tuft withdraw force of tile carpets. Further, the present inventors have developed a method for manufacturing a nonwoven fabric for tile carpet base fabric in which basic characteristics such as tensile strength of the nonwoven fabric are maintained excellently even when the recycled polyester raw material is applied and the content thereof is increased.

Now, the present disclosure will be described in detail.

Spunbond Nonwoven Fabric and Manufacturing Method Thereof

According to one embodiment of the present disclosure, there can be provided a spunbonded nonwoven fabric including: a fiber web of mixed filament yarns of a first filament prepared from a polyester and a recycled polyester each having a melting point of 255° C. or more and a second filament prepared from a copolyester having a lower melting point than that of the first filament by 30° C. or more, wherein the first filament is a filament having a hollow fiber cross-section having a hollow ratio of 10 to 20%, wherein the raw material of the recycled polyester has an average number of foreign matters with a size of 1.0 to 10.0 µm, of 10 or less, and wherein the spunbonded nonwoven fabric has a tensile strength of 20 kgf/5 cm or more and a tensile elongation of 20% or more as measured according to the KS K 0521 test method, and is used as a base fabric for tile carpets.

The present disclosure is characterized by using a recycled polyester raw material (recycled polyester) having a low foreign matter content and excellent physical properties. In addition, the present disclosure relates to a spunbonded nonwoven fabric in which, in the case of a filament obtained using the recycled polyester raw material, a high-thickness nonwoven fabric without deterioration of physical properties can be provided by using a filament that satisfies a certain range of hollow ratio in the form of a hollow fiber cross-section, it is excellent in mechanical properties such as room-temperature physical properties (tensile strength, tensile elongation), and when applied as a base fabric for finished product tile carpets, it is possible to obtain the effect of improving sound absorption performance and tuft withdraw force, and to a method for manufacturing the same.

Specifically, the spunbond nonwoven fabric is provided by using a first filament in the form of a hollow fiber cross-section containing the recycled polyester having the above-described physical properties in a certain content or more, and a second filament obtained from a copolyester raw material having a lower melting point than that of the first filament. Particularly, since the spunbond nonwoven fabric uses a recycled polyester raw material with a minimized average foreign matter content, it exhibits the physical properties of the final spunbond nonwoven fabric at a level equal to or higher than that of the conventional one, thereby providing an excellent effect of cost reduction and price competitiveness. In addition, since the spunbond applied in the form of a hollow fiber is provided with a high thickness, the sound absorption performance and the tuft withdraw force can be improved.

According to a further embodiment of the present disclosure, when the weight per unit area is 90 g/m², the thickness may be 0.35 mm to 0.40 mm.

Such a spunbond nonwoven fabric can be provided according to the following method.

Specifically, according to another embodiment of the present disclosure, there can be provided a method for manufacturing the spunbond nonwoven fabric, the method including the steps of: a) performing conjugate spinning of a first filament prepared from a polyester and a recycled polyester each having a melting point of 255° C. or more and a second filament prepared from a copolyester having a lower melting point than that of the first filament by 30° C. or more, and stretching the filaments to produce a mixed filament yarn; b) laminating the mixed filament yarn to form a fiber web; and c) subjecting the fiber web to a calendering process and heat-bonding, wherein the first filament is a filament having a hollow fiber cross-section having a hollow ratio of 10 to 20%, and the raw material of the recycled polyester has an average number of foreign matters with a size of 1.0 to 10.0 µm, of 10 or less.

The spunbond nonwoven fabric and a method for manufacturing the same will be described in more detail.

a) According to the present disclosure, the step of preparing a mixed filament yarn using two types of filaments having different melting points is performed.

Particularly, the spunbond nonwoven fabric includes two types of raw materials having different melting points (melting temperatures) from each other.

Specifically, a) the step of performing conjugate spinning of a first filament prepared from a polyester and a recycled polyester each having a melting point of 255° C. or more and a second filament prepared from a copolyester having a lower melting point than that of the first filament by 30° C. or more, and stretching the filaments to produce a mixed filament yarn, is performed.

The first filament uses a filament in the form of a hollow fiber cross-section produced using a pure polyester raw material having a melting point of 255° C. or more before being recycled and a recycled polyester raw material having a melting point of 255° C. or more.

In the recycled polyester contained in the first filament, the average number of foreign matters with a size of 1.0 to 10.0 µm is preferably 10 or less. When the number is more than 10, a chip agglomeration phenomenon may occur, and the physical properties of the nonwoven may be deteriorated due to poor spinnability.

At this time, the intrinsic viscosity (IV) of the recycled polyester raw material contained in the first filament is preferably 0.60 to 0.80 dl/g. When the intrinsic viscosity of the recycled polyester raw material is less than 0.60 dl/g, there is a disadvantage in that the operability is inferior due to problems such as filament cutting, and the effect of improving the mechanical properties of the nonwoven fabric due to the production of the low-viscosity filament is insignificant, and when the intrinsic viscosity exceeds 0.80 dl/g or more, in the process of melt extrusion, process problems may occur due to excessive increases in the extruder internal pressure and the spinning nozzle pressure.

Therefore, the recycled polyester contained in the first filament may use a recycled polyester that has a melting point of 255° C. or more, an intrinsic viscosity (IV) of 0.60 to 0.80 dl/g, and the average number of foreign matters with a size of 1.0 to 10.0 μm, of 3 to 10.

More preferably, the recycled polyester contained in the first filament uses a recycled polyethylene terephthalate chip that has a melting point of 255° C. or more, an intrinsic viscosity (IV) of 0.60 to 0.80 dl/g, and the average number of foreign matters with a size of 1.0 to 10.0 μm, of 3 to 10.

The recycled polyester may be a polyester copolymer including a post-industrial recycled (PIR) polyethylene terephthalate in the form of chips recycled from waste in the well-known polyester manufacturing process, a post-consumer recycled (PCR) polyethylene terephthalate, or a mixture thereof, and such materials that can be used include those containing an average number of foreign matters of 10 or less as described above. Further, the materials can those purchased and can use a polyester copolymer regenerated by a method well known in the art.

Thus, the first filament may contain a copolymer such as adipic acid (AA), isophthalic acid (IPA), neopentyl glycol (NPG), or butadiene (BD), depending on the regenerated raw material.

Further, the pure polyester having a melting point of 255° C. or more that can be used in the first filament is prepared according to a well-known polyester manufacturing process, and may include a copolymer such as adipic acid (AA), isophthalic acid (IPA), neopentyl glycol (NPG), or butadiene (BD). For example, the pure polyester may be a polyester copolymer including polyethylene terephthalate having a melting point of 255° C. or more.

Further, the first filament is characterized in that it is composed of a filament in the form of a hollow fiber having a certain hollow ratio.

Specifically, the first filament may have a hollow ratio of 10% to 20% calculated by the following Equation 1.

Hollow ratio (%)=(the width of the circumscribed circle of the first filament/the width of the inscribed circle of the first filament)×100     [Equation 1]

FIG. 1 is a cross-sectional view of a first filament in the form of a hollow fiber according to an embodiment of the present disclosure.

In FIG. 1 (a), A means the filament diameter, B means the distance between the outer diameter and the inner diameter of the filament, C is the distance between the outer diameter and the outer diameter, the A determines the fineness (denier) of the first filament, and B and C affect the hollow ratio. Further, FIG. 1 (b) is an electron micrograph showing a cross-sectional view of the first filament in the form of a hollow fiber according to an embodiment of the present disclosure.

Usually, as the hollow ratio expressed by Equation 1 increases, it has an advantage of increasing the sound absorption performance, while it is difficult to maintain a hollow shape during filament spinning, and the filament cross-sectional shape changes during spinning, so cutting easily occurs, which makes it difficult to manufacture a filament. On the contrary, as the hollow ratio decreases, the spinnability and operability are improved, but there is a problem that the sound absorption performance of the finished product tile carpet is inferior. Therefore, it is important to optimize the range of the hollow ratio of the filament used in the manufacture of the spunbond nonwoven fabric. According to the present disclosure, preferably, by configuring the first filament having a hollow ratio in the optimal range of 10 to 20% as described above, it is possible to maintain a hollow shape during filament spinning, and to maintain excellent sound absorption performance of the finished product as well as excellent spinnability and operability.

Further, the content ratio of the polyester of the first filament and the recycled polyester may be 0:50 to 50:100% by weight. Alternatively, the content ratio of the polyester and the recycled polyester of the first filament may be 30:70, 50:50, or 0:100% by weight.

That is, in the first filament, the content of pure polyester is 30% by weight or less or 50% by weight or less based on the weight of the first filament, and the remaining content can be used as recycled polyester. Further, the total content of the first filament may be used by limiting only to recycled polyester.

As described above, in the present disclosure, even if the content of the recycled polyester is used in excess of 70 to 100% by weight, it is used in the form of a hollow fiber having a hollow ratio of 10 to 20%, whereby there are no problems such as chip agglomeration, poor spinnability, and deterioration of non-woven fabric physical properties when using conventional recycled polyester, and it is possible to realize nonwoven fabric properties equal to or higher than the case made only of pure polyester, particularly, it can contribute to the improvement of sound absorption and tuft withdraw force. Therefore, the present disclosure can provide a spunbond nonwoven fabric for tile carpet base fabric not only capable of resource recycling but also having excellent processability.

Further, the second filament may include a copolyester having a lower melting point than that of the first filament by 30° C. or more. Therefore, the second filament may use a copolyester having a melting point of 30° C. or more or 160° C. or more to 180° C. or less compared to that of the first filament including a copolymer of adipic acid (AA), isophthalic acid (IPA), neopentyl glycol (NPG), or a mixture thereof. However, the monomer constituting the copolyester is not limited to the above type, and it can be selected and used without limitation as long as it can provide a polyester copolymer having the specific melting point range.

The mixed filament yarn preferably contains the first filament and the second filament in a content ratio of 30:70 to 95:5 wt %. More preferably, the first filament and the second filament in the mixed filament yarn are contained in a content ratio of 50:50 to 95:5 or 80:20 to 95:5% by weight. The content ratio of the first filament and the second filament can be controlled by controlling the discharge amount of the molten polymer or by changing the design of the spinneret.

In one example, the content of the first filament in which a pure polyester and a recycled polyester each have a melting point of 255° C. or more is 80 to 95 wt % of the whole nonwoven fabric, and in the second filament whose raw material is a copolyester having a melting point of 220° C. or less, two types of filaments, which are 20 to 5 wt % of the total of the nonwoven fabric, are used to form a web in the form of conjugate spinning (matrix & binder).

Meanwhile, according to the present disclosure, the process of including b) a step of forming a fiber web by laminating the mixed filament yarn, and c) a step of subjecting the fiber web to a calendering process and heat-bonding, can be performed to provide a spunbond nonwoven fabric.

As described above, the filament spun in the form of conjugate spinning is sufficiently drawn so that the spinning speed is 4500 to 5500 m/min using a high-pressure air stretching device. In the case of the first filament, which is a recycled raw material, the fineness is 5 to 10 denier, and in the case of the second filament having a lower melting point than the first filament, the filament is configured to have fineness of 2 to 5 denier.

In addition, the step of manufacturing the spunbond nonwoven includes a calendering process using a smooth roll and a hot air process at a temperature similar to or corresponding to the melting point of the second filament.

In one example, the filament fiber produced by the above method is positioned in the form of a web on a conveyor net, and then the thickness of the nonwoven fabric is adjusted through the calendering process of a heated smooth roll, and then a nonwoven fabric is prepared by bonding using hot air at a temperature similar to the melting point of the second filament.

The calendering process can be performed at a temperature of 150 to 200° C., and the thickness of the nonwoven fabric can be adjusted by such a process. In one example, in the present disclosure, when the weight per unit area is 90 g/m², a calendering process can be performed so that the thickness of the spunbond is 0.35 mm to 0.40 mm.

The heat-bonding step can be performed under hot air conditions at a temperature of 0 to 10° C. higher than the melting point of the low melting point copolyester constituting the second filament. Therefore, the hot air process can be performed at a temperature corresponding to the melting point of the second filament, for example, in a range of 160° C. or more to 180° C. or less.

Tile Carpet

According to the method described above, a spunbond nonwoven fabric suitable for use as a tile carpet base fabric can be provided. In addition, in the present disclosure, by using the spunbond nonwoven fabric as a base fabric for tile carpets, it is possible to provide a tile carpet with improved sound absorption and tuft withdraw force.

Therefore, according to another embodiment of the present disclosure, there can be provided tile carpet that includes the spunbond nonwoven fabric having the above physical properties as a base fabric, and has a sound absorption coefficient (at 500 Hz) of 0.2 or more and a carpet tuft withdraw force of 2.0 kgf or more.

Specifically, the nonwoven fabric provided by the above-mentioned method can be subjected to a tufting process, a back-coating process, and a cutting process according to a well-known method to provide a tile carpet.

According to a more specific example, the nonwoven fabric is subjected to a tufting process (process of planting threads in a non-woven fabric) on the surface of a loop type polypropylene BCF (bulky continuous filament) yarn of about 3000 De'/150 Fila. with a gauge (the needle interval is represented by INCH as a unit indicating the density of the needle in a tuft machine, and the density in the width direction of the TUFTED CARPET is determined by GAUGE) of about 1/10 and a stitch (density in a longitudinal direction of the tufted carpet) of about 10.5. Then, a non-woven fabric composed of glass fibers having a unit weight of about 40 g/m² and a PVC solution of about 6.0 kg/m² is impregnated onto the back surface of the tufted nonwoven fabric. Then, the impregnated product is heat-cured in a thermal chamber at about 180° C., and finally subjected to a cutting process (standard: 50 cm×50 cm). Thereby, a high-performance finished product tile carpet having a tuft withdraw force (strength of pulling the loop after loop type of tufting) of about 2.0 kgf can be manufactured.

Advantageous Effects

According to the present disclosure, recycled polyester raw materials having a low foreign matter content and improved physical properties of raw material are applied, whereby it is possible to manufacture a nonwoven fabric which has physical properties that are equivalent to or higher than that of non-woven fabric to which only pure polyester raw material is applied, and is excellent in price competitiveness such as cost reduction. Also, in the present disclosure, even if a recycled polyester raw material is used, it is possible to manufacture a high-performance spunbond nonwoven fabric without chip agglomeration, poor spinnability, and deterioration of nonwoven fabric physical properties as in the conventional case. In addition, in the present disclosure, it is possible to manufacture a nonwoven fabric having excellent sound absorption performance as the nonwoven fabric by applying a hollow fiber that satisfies a certain hollow ratio when applying recycled polyester. Therefore, according to the present disclosure, it is possible to manufacture a tile carpet product having excellent sound absorption performance and tuft withdraw force with a high-thickness nonwoven fabric.

BRIEF DESCRIPTION OF THE DRAWING

FIG. 1 is a cross-sectional view of a first filament in the form of a hollow fiber according to an embodiment of the present disclosure.

DETAILED DESCRIPTION OF THE EMBODIMENTS

Hereinafter, the action and effect of the invention will be described in more detail with reference to specific examples of the invention. However, these examples are presented for illustrative purposes only and the scope of the invention is not limited thereby in any way.

Example 1

The first filament (recycled polyester having an IV of 0.65 dl/g, a content of 70 wt % relative to pure polyester of 30 wt %, and a melting point of 255° C., i.e., the content of recycled PET is 70 wt %) and the second filament (copolyester with a melting point of about 220° C.) each having a filament hollow ratio of 10% were melted using a continuous extruder at a spinning temperature of about 280° C., then subjected to conjugate spinning so that the content ratio of the first filament and the second filament became 30:70 wt %, and stretched, whereby the discharge amount and the number of spinneret capillaries were adjusted so that the average fineness of the first filament produced was 8.5 denier. Further, as the pure polyester, PET having a melting point of 255° C. and an intrinsic viscosity of 0.65 dl/g was used.

Then, the continuous filaments discharged from the capillaries were solidified with cooling air, and then stretched so that the spinning speed was 5000 m/min using a high-pressure air stretching device to produce filament fibers.

Next, the filament fibers produced above were laminated in the form of a web on a conveyor net by a conventional fiber opening method. The laminated web was subjected to a calendering process by a heated smooth roll to impart smoothness and appropriate thickness.

The laminated filaments were heat-bonded at a hot air temperature of about 220° C. to produce a spunbond nonwoven fabric having a weight per unit area of 90 g/m² and a thickness of 0.35 mm.

Example 2

A spunbond nonwoven fabric was produced in the same manner as in Example 1, except that a recycled PET raw material having an IV of 0.72 dl/g and a melting point of 255° C. with a content of 100 wt % relative to pure polyester was applied as a first filament having a filament hollow ratio of 15%, and the thickness was adjusted to 0.35 mm at the same weight per unit area.

Example 3

A nonwoven fabric was produced in the same manner as in Example 1, except that a recycled PET raw material having an IV of 0.72 dl/g and a melting point of 255° C. with a content of 100 wt % relative to pure polyester was applied as a first filament having a filament hollow ratio of 15%, and the thickness was adjusted to 0.38 mm at the same weight per unit area.

Example 4

A nonwoven fabric was produced in the same manner as in Example 1, except that a recycled PET raw material having an IV of 0.72 dl/g and a melting point of 255° C. with a content ratio of 50:50 wt % relative to pure polyester was applied as a first filament having a filament hollow ratio of 17%, and the thickness was adjusted to 0.40 mm at the same weight per unit area.

Example 5

A nonwoven fabric was produced in the same manner as in Example 1, except that a recycled PET raw material having an IV of 0.72 dl/g and a melting point of 255° C. with a content of 100 wt % relative to pure polyester was applied as a first filament having a filament hollow ratio of 17%, and the thickness was adjusted to 0.40 mm at the same weight per unit area.

Comparative Example 1

A nonwoven fabric was produced in the same manner as in Example 1, except that pure polyester of 100 wt % was applied as a first filament having a filament hollow ratio of 0%, and the thickness was adjusted to 0.30 mm at the same weight per unit area.

Comparative Example 2

A nonwoven fabric was produced in the same manner as in Example 1, except that a recycled PET raw material having an IV of 0.65 dl/g and a melting point of 255° C. with a content of 100 wt % relative to pure polyester was applied as a first filament having a filament hollow ratio of 5%, and the thickness was adjusted to 0.33 mm at the same weight per unit area.

Comparative Example 3

A nonwoven fabric was produced in the same manner as in Example 1, except that a recycled PET raw material having an IV of 0.60 dl/g and a melting point of 255° C. with a content of 70 wt % relative to pure polyester of 30 wt % was applied as a first filament having a filament hollow ratio of 5%, and the thickness was adjusted to 0.33 mm at the same weight per unit area.

Comparative Example 4

A nonwoven fabric was produced in the same manner as in Example 1, except that a recycled PET raw material having an IV of 0.72 dl/g and a melting point of 255° C. with a content of 100 wt % relative to pure polyester was applied as a first filament having a filament hollow ratio of 15%, and the thickness was adjusted to 0.38 mm at the same weight per unit area.

Reference Example 1

A nonwoven fabric was produced in the same manner as in Example 1, except that recycled PET raw material having an IV of 1.00 dl/g and a melting point of 255° C. with a content of 100 wt % relative to pure polyester was applied as a first filament having a filament hollow ratio of 15%, and the thickness was adjusted to 0.38 mm at the same weight per unit area.

Comparative Example 5

A nonwoven fabric was produced in the same manner as in Example 1, except that recycled PET raw material having an IV of 0.72 dl/g and a melting point of 255° C. with a content of 100 wt % relative to pure polyester was applied as a first filament having a filament hollow ratio of 30%, and the thickness was adjusted to 0.45 mm at the same weight per unit area.

TABLE 1

| Category | Recycled polyester raw material | | First filament | | |
| --- | --- | --- | --- | --- | --- |
| | IV (dl/g) | Average number of foreign matters (1.0~10.0 μm) (number) | Pure/recycled polyester content ratio (wt %) | Hollow ratio (%) | Thickness (mm) |
| Example 1 | 0.65 | 5.8 | 30/70 | 10 | 0.35 |
| Example 2 | 0.72 | 6.8 | 0/100 | 10 | 0.35 |
| Example 3 | 0.72 | 5.1 | 0/100 | 15 | 0.38 |
| Example 4 | 0.72 | 6.1 | 50/50 | 10 | 0.38 |
| Example 5 | 0.72 | 7.1 | 0/100 | 17 | 0.40 |
| Comparative Example 1 | 0.65 | 4.9 | 100/0 | 0 | 0.30 |
| Comparative Example 2 | 0.65 | 7.1 | 0/100 | 5 | 0.33 |
| Comparative Example 3 | 0.55 | 5.8 | 30/70 | 5 | 0.33 |
| Comparative Example 4 | 0.72 | 10.7 | 0/100 | 15 | 0.38 |

TABLE 1-continued

| | Recycled polyester raw material | | First filament | | |
|---|---|---|---|---|---|
| | | Average number of foreign matters (1.0~10.0 μm) | Pure/recycled polyester content | Hollow ratio | Thickness |
| Category | IV (dl/g) | (number) | ratio (wt %) | (%) | (mm) |
| Reference Example 1 | 1.00 | 8.8 | 0/100 | 15 | 0.38 |
| Comparative Example 5 | 0.72 | 7.0 | 0/100 | 22 | 0.45 |

Experimental Example

The physical properties of the examples, comparative examples, and reference example were measured according to the following measurement methods for each evaluation item, and the results are shown in Table 2 below.

Experimental Example 1: Tensile Strength (kgf/5 cm) and Tensile Elongation (%)

The KS K 0521 Test Method was used. Specifically, a specimen having a size of width×length=5 cm×20 cm was clamped with an upper/lower 5 cm×5 cm jig using an Instron testing machine, and then it was measured at a tensile speed of 200 mm/min.

Experimental Example 2: Sound Absorption Coefficient (at 500 Hz)

The reverberation time in the state where the sample was not installed in the reverberation room according to the procedure stipulated in Measurement of Sound Absorption in a Reverberation Room (KS F 2805:2014), and the reverberation time after a sample was installed were determined, and then the sound absorption coefficient was calculated according to the following Equation 2.

$$\text{Sound Absorption Coefficient } (A) = 55.3\, V/cS(1/T1 - 1/T2) \quad \text{[Equation 2]}$$

In Equation 2,
A: sound absorption coefficient
T1: reverberation time (s) in a state where a sample was added
T2: reverberation time (s) in a state where a sample was not added
V: reverberation room volume ($m^3$)→200.0 $m^3$
S: sample area ($m^2$)
C: speed of sound in air (m/s)→331.42+0.61t (t: temperature of air→17±1)

Experimental Example 3: Measurement Test of Tuft Withdraw Force

It was measured according to the standard KS K ISO 4919 (Carpet-Determination of Tuft Withdrawal Force). Specifically, one loop to be measured of the tufted sample was fixed to the measuring device. The loop to be measured and the adjacent loops on both sides were cut. The strength (peak) value appearing when the loop to be measured was pulled in the direction perpendicular to the sample using an Instron testing machine was determined as the tuft withdrawal force, which was repeated 5 times and the average value was taken.

TABLE 2

| Category | Strength (kgf/5 cm) (MD/CD) | Elongation (%) (MD/CD) | Sound absorption coefficient at 500 Hz | Tuft withdrawal force (kgf) | Spinnability evaluation | Final evaluation |
|---|---|---|---|---|---|---|
| Example 1 | 24.1/25.6 | 25.1/27.6 | 0.26 | 2.2 | ○ | ○ |
| Example 2 | 23.8/23.4 | 23.8/25.6 | 0.28 | 2.3 | ○ | ○ |
| Example 3 | 22.8/24.1 | 24.2/26.8 | 0.35 | 2.6 | ○ | ○ |
| Example 4 | 23.1/22.8 | 23.4/24.7 | 0.34 | 2.8 | ○ | ○ |
| Example 5 | 21.4/23.6 | 22.1/24.9 | 0.37 | 2.9 | ○ | ○ |
| Comparative Example 1 | 22.8/23.7 | 23.3/23.2 | 0.15 | 1.8 | ○ | x |
| Comparative Example 2 | 22.5/23.1 | 22.9/24.1 | 0.22 | 1.7 | ○ | x |
| Comparative Example 3 | 20.8/21.2 | 21.4/22.8 | 0.21 | 1.9 | Δ | x |
| Comparative Example 4 | 23.1/25.8 | 24.1/25.4 | 0.25 | 2.3 | Δ | x |
| Reference Example 1 | Production of sheet was impossible | | | | | x |
| Comparative Example 5 | Production of sheet was impossible | | | | | x |

Looking at the results of Table 2, in Examples 1 to 5, the recycled polyester raw material was applied to at least 50 wt % or more to 100 wt % and a hollow fiber having a certain hollow ratio was used as compared to the comparative examples and the reference example, thereby exhibiting the tensile strength and elongation equal to or higher than that of the method using only a pure polyester raw material. Also, Examples 1 to 5 can provide a spunbond nonwoven fabric with excellent spinnability and easy thickness adjustment even when recycled polyester raw materials are used, thereby providing a tile carpet with a high sound absorption coefficient and excellent tuft withdrawal force.

On the other hand, in Comparative Example 1 consisting only of a pure polyester raw material and with a low average foreign matter content, but with no hollow fiber, the sound absorption and tuft withdrawal force were inferior to those of the examples when applied as a tile carpet of the finished product. In addition, in Comparative Examples 2 to 4, as the first filament outside the average foreign matter range and/or hollow ratio of the present disclosure was used, the physical properties of the spunbond nonwoven fabric were deteriorated, or the spinnability was poor, and the sound absorption and tuft withdrawal force of the final tile carpet were inferior to those of the examples. Further, in Reference Example 1, a recycled polyester raw material was used, but a material having an excessively high intrinsic viscosity was used, whereby the sheet was not manufactured and thus the tile carpet could not be manufactured. In Comparative Example 4, an attempt was made to improve sound absorption by increasing the hollow ratio of the first filament, but the sheet was also not manufactured and thus the tile carpet could not be manufactured.

The invention claimed is:

1. A spunbonded nonwoven fabric comprising
   a fiber web of mixed filament yarns of a first filament prepared from a polyester and a recycled polyester each having a melting point of 255° C. or more; and a second filament prepared from a copolyester having a lower melting point than that of the first filament by 30° C. or more,
   wherein the first filament is a filament having a hollow fiber cross-section having a hollow ratio of 10 to 20%,
   wherein a raw material of the recycled polyester has an average number of foreign matters with a size of 1.0 to 10.0 μm, of 10 or less, and
   wherein the spunbonded nonwoven fabric has tensile strength of 20 kgf/5 cm or more and tensile elongation of 20% or more as measured according to the KS K 0521 test method, and is used as a base fabric for tile carpets.

2. The spunbonded nonwoven fabric according to claim 1, wherein
   the recycled polyester contained in the first filament uses a recycled polyester that has a melting point of 255° C. or more, an intrinsic viscosity (IV) of 0.60 to 0.80 dl/g, and an average number of foreign matters with a size of 1.0 to 10.0 μm, of 3 to 10.

3. The spunbonded nonwoven fabric according to claim 2, wherein
   the recycled polyester contained in the first filament uses a polyethylene terephthalate chip that has a melting point of 255° C. or more, an intrinsic viscosity (IV) of 0.60 to 0.80 dl/g, and an average number of foreign matters with a size of 1.0 to 10.0 μm, of 3 to 10.

4. The spunbonded nonwoven fabric according to claim 1, wherein
   in the first filament, the content ratio of the polyester and the recycled polyester is x:50 wt % (x being a number larger than 0 and equal to or smaller than 25).

5. The spunbonded nonwoven fabric according to claim 1, wherein
   the combined filament yarn contains the first filament and the second filament in a content ratio of 30:70 to 95:5 wt %.

6. The spunbonded nonwoven fabric according to claim 1, wherein
   the first filament is a filament having an average fineness of 5 to 10 denier, and the second filament is a filament having an average fineness of 2 to 5 denier or less.

7. The spunbonded nonwoven fabric according to claim 1, wherein
   the spunbond nonwoven fabric has a thickness of 0.35 mm to 0.40 mm when the weight per unit area is 90 g/m$^2$.

8. A tile carpet comprising the spunbonded nonwoven fabric according to claim 1 as a base fabric, and having a sound absorption coefficient (at 500 Hz) of 0.2 or more, and a tuft withdraw force of carpets of 2.0 kgf or more.

* * * * *